Figures 1, 2:
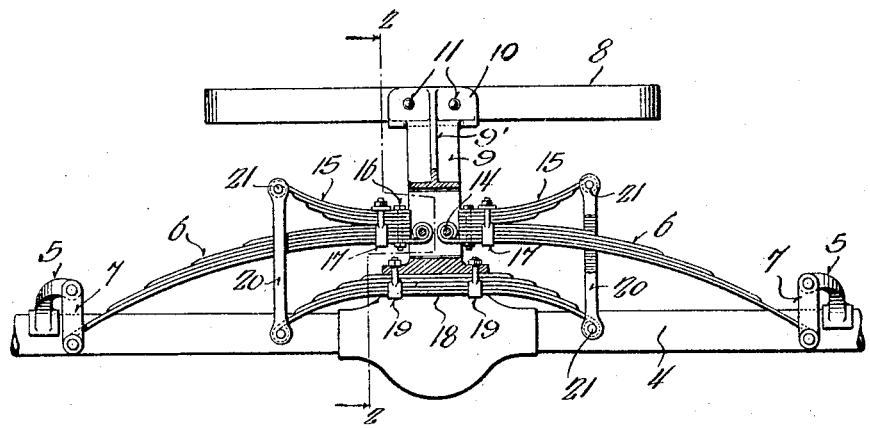

A. L. JENKINS.
VEHICLE SPRING CONSTRUCTION.
APPLICATION FILED MAY 24, 1919.

1,324,552.

Patented Dec. 9, 1919.

Inventor:
Arthur L. Jenkins
By Morsell & Keeney,
Attorneys

UNITED STATES PATENT OFFICE.

ARTHUR L. JENKINS, OF DOUSMAN, WISCONSIN.

VEHICLE-SPRING CONSTRUCTION.

1,324,552.  Specification of Letters Patent.  Patented Dec. 9, 1919.

Application filed May 24, 1919. Serial No. 299,505.

*To all whom it may concern:*

Be it known that I, ARTHUR L. JENKINS, a citizen of the United States, and resident of Dousman, in the county of Waukesha and State of Wisconsin, have invented new and useful Improvements in Vehicle-Spring Construction, of which the following is a description, reference being had to the accompanying drawings, which are a part of this specification.

The present invention relates to spring constructions for automobiles which will efficiently absorb shocks imparted to the vehicle and which will prevent or check lateral swinging of the vehicle frame.

With the above and other objects in view which will appear as the description proceeds, my invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawing, I have illustrated one complete example of the physical embodiment of my invention, and a modification thereof constructed according to the best mode I have so far devised for the practical application of the principles thereof, and in which:

Figure 1 is a rear elevation of the device embodying the invention, parts being broken away and in sections to more clearly illustrate the details of construction, and Fig. 2 is a view, part in section and part in elevation of a slightly modified construction of my invention, said view being taken on the line 2—2 of Fig. 1.

Referring now more particularly to the drawing, numeral 4 designates a portion of the rear axle and differential housing, 5 the spring perches, 6 the downwardly bowed main supporting leaf spring having its outer ends pivotally supported from the perches 5 by means of shackle members 7, 8 the automobile chassis frame, and 9 a supporting bracket secured to the chassis 8 and spring 6; all of the above being as hereinafter more clearly set forth and described.

The supporting bracket 9 has its upper end shaped to conform with the chassis frame as at 10 and secured thereto by fastening means 11, and is directed rearwardly from the chassis frame then formed with the downwardly extending portion 12 which has the lower end thereof pivoted with elongated opening 13 in which is pivoted the spring 6. The spring 6 is composed of two complementary sections and each section has the lowermost leaf thereof extended beyond the termination of the other leaves and then curved to provide means for pivotally engaging a pivot bolt 14 extending across the elongated opening 13 of the supporting bracket member. An outwardly extending supplemental spring 15 is secured to each section of spring 6 and has its inner end in line with the inner end of each of said sections and secured thereto by a bolt 16 passing through the leaves of said sections and said supplemental spring, the bolt 16 serving to retain the leaves of the various springs in position. The springs 15 are further secured to the adjacent section of spring 6 by means of a clip member 17 disposed adjacent the inner ends of said springs and sections. The springs 15 are bowed in a direction opposite to the curvature of spring 6 and each spring 15 has its outer end in pivotal link connection with the adjacent end of a second supplemental spring 18 secured to the extreme lower end of bracket 9 by means of clips 19, the connections between said springs 15 and the spring 18 consisting of a pair of links 20 pivotally engaging the adjacent ends of said springs as at 21, the links 20 being spaced apart and passing on each side of spring 6 as will be understood.

In the form of my invention depicted in Fig. 1, I provide spring perches 5 which are rigidly secured to the housing 4, and in place of said perches, a construction as illustrated in Fig. 2 may be employed. In Fig. 2 a longitudinally extending spring 22 is secured to the housing 4 near each end thereof by means of clips 23 and has pivoted to its outer end a shackle 24 which has pivoted therein the outer end 25 of spring 6. Spring 22 may if desired have its inner end 22' extended inwardly and connected to the chassis frame in a desired manner, but as this forms no important part of my invention, the same has not been illustrated in the drawings.

The bracket 9 has its upper portion directed inwardly in order that its lower end 12 may be extended rearwardly of the differential housing as will be obvious, and the bracket 9 has formed centrally thereto the reinforcing ribs 9' which securely strengthen the bracket and enable it to support the weight of the vehicle.

With this construction, the springs 15 and spring 18, through their links 20 check any tendency the vehicle frame may have toward lateral movement, and also absorb any severe shock given the vehicle by striking a rut in the road or the like, in that springs 15 will tend to check or slow up the movement of spring 6 and also check or slow up the return movement of spring 18.

From the foregoing description, taken in connection with the accompanying drawing, it will be readily seen that I provide a spring construction which will be particularly adapted for the purposes described, and which will provide a compound leverage in that as the spring 6 is compressed, the spring 15 is also compressed as it will be moved with spring 6 and compressed by the links 20 restraining its movement by compressing spring 18. By this arrangement, for each movement of the axle with respect to the chassis frame, three springs are compressed, insuring a greater resilient support for the chassis frame.

What I claim as my invention is:

1. A vehicle spring construction comprising a bracket member secured to a chassis frame, a main supporting spring having one end secured to the bracket member and its other end connected with an axle, a supplemental spring having its inner end rigidly secured to the end of the main supporting spring secured to the bracket member, a second supplemental spring rigidly secured to said bracket member and having its end in substantially vertical alinement with the end of the other supplemental spring, and link means connecting the ends of said supplemental springs.

2. A vehicle spring construction comprising a bracket member secured to a chassis frame, a main supporting spring having its inner end pivotally secured to the bracket member and its outer end connected with an axle, a supplemental spring having its inner end rigidly secured to the top side of the main supporting spring adjacent its inner end, said supplemental spring being outwardly and upwardly curved, a second supplemental spring rigidly secured to the under side of the bracket member and having its outer end in substantially vertical alinement with the outer end of the other supplemental spring, said second supplemental spring being outwardly and downwardly curved, and a rigid link member pivotally connected at its ends with the ends of the supplemental springs.

3. In a vehicle, the combination with the chassis frame and its supporting axle, of a bracket member depending from the chassis frame, a main supporting spring having its intermediate portion pivotally carried by said supporting bracket and its outer ends connected with said axle, an upwardly bowed supplemental spring member fixed to said main supporting spring, a downwardly bowed supplemental bow spring fixed to said supporting bracket, and means connecting the adjacent ends of said supplemental springs.

4. In a vehicle, the combination with the chassis frame and its supporting axle, of a bracket member carried by the chassis frame, a main supporting spring member comprising two complementary sections each having their inner ends pivotally connected with said bracket member and their outer ends connected with said axle, a supplemental spring carried by each complementary section of said main supporting spring and having its outer end inwardly of the end of the adjacent spring section, a supplemental spring fixed to said bracket member, and link means connecting the adjacent ends of said supplemental springs.

5. In a vehicle, the combination with the chassis frame and its supporting axle, of a bracket member having its upper end rigidly connected with the chassis frame and its lower end provided with an elongated opening, a leaf spring member having one end pivoted in the elongated opening of the bracket member and its other end in pivotal connection with said axle, a second spring member having one end adjacent the end of said other spring member and secured thereto and having its other end disposed medially of the end of said other spring member, a third spring member carried by said bracket member and having its end in a line with the end of said second spring member, and means connecting ends of said second and third spring members.

In testimony whereof, I affix my signature.

ARTHUR L. JENKINS.